United States Patent
Schneider et al.

(10) Patent No.: US 6,300,898 B1
(45) Date of Patent: Oct. 9, 2001

(54) AIRBORNE GPS GUIDANCE SYSTEM FOR DEFEATING MULTIPLE JAMMERS

(76) Inventors: Arthur J. Schneider, 9995 S. Suncove Dr., Tucson, AZ (US) 85758; James G. Small, 4361 N. Wilmot Rd., Tucson, AZ (US) 85750

( * ) Notice: Subject to any disclaimer, the term of this patent is extended or adjusted under 35 U.S.C. 154(b) by 0 days.

(21) Appl. No.: 09/480,957

(22) Filed: Jan. 10, 2000

Related U.S. Application Data

(63) Continuation of application No. 09/061,642, filed on Mar. 16, 1998, now abandoned.

(51) Int. Cl.$^7$ ................................................. H04B 7/185
(52) U.S. Cl. ............................... 342/357.09; 342/357.06; 342/62
(58) Field of Search .................. 342/357.01, 357.06, 342/357.09, 62, 63, 462

(56) References Cited

U.S. PATENT DOCUMENTS

| | | | |
|---|---|---|---|
| 5,260,709 | * | 11/1993 | Nowakowski ........................ 342/62 |
| 5,310,134 | * | 5/1994 | Hsu et al. .......................... 244/3.12 |
| 5,397,079 | * | 3/1995 | Strentz et al. ....................... 244/3.2 |
| 5,451,014 | * | 9/1995 | Dare et al. ......................... 244/3.15 |
| 5,554,994 | * | 9/1996 | Schneider et al. ................... 342/357 |
| 5,686,924 | | 11/1997 | Trimble . |
| 5,841,059 | | 11/1998 | Laurend . |
| 5,938,148 | * | 8/1999 | Orenstein .......................... 244/3.15 |
| 5,943,009 | * | 8/1999 | Abbott ............................ 342/357.02 |

OTHER PUBLICATIONS

Thomas A. Stransell, Jr., Global Positioning System, "RTCM SC–104 Recommended Pseudolite Signal Specification".

Allan J. Brockstein, GPS–Kalman–Augmented Inertial Navigation System Performance, pp. 864–870.

* cited by examiner

*Primary Examiner*—Dao Phan
(74) *Attorney, Agent, or Firm*—William J. Benman; Glenn H. Lenzen, Jr.

(57) ABSTRACT

A missile guidance system designed to operate on GPS signals in an anti-jamming environment. The inventive system includes first, second and third airborne vehicles (20). A GPS receiver (24) is mounted on each of the three vehicles (20) to receive signals transmitted from spaceborne satellites (14). Each vehicle (20) acts as a pseudo-satellite or 'pseudolite'. The received GPS signals are processed by a processor (26) to provide a first intermediate signal indicating the position of the vehicle (20). This signal is retransmitted from each vehicle and received by a GPS receiver mounted on a missile. The received intermediate signal is processed on the missile to provide an output signal indicating the position thereof. The pseudolites would be airborne in the vicinity of a target area. Because the pseudolites are relatively close to the targets compared to a satellite in high altitude orbit and because the pseudolites would be able to transmit a kilowatt or more power, the signal strength may be improved significantly. To succeed as a jammer, a jammer, successful against GPS satellites, would need considerably more power to succeed against aircraft carried pseudolites. The pseudolite system delivers GPS signals into the target area 40–70 dB stronger than signals coming directly from GPS satellites. By timing the signals for 100% time coverage, enemy C/A code receivers will be jammed because they are limited to a J/S capability of 30 dB.

14 Claims, 6 Drawing Sheets

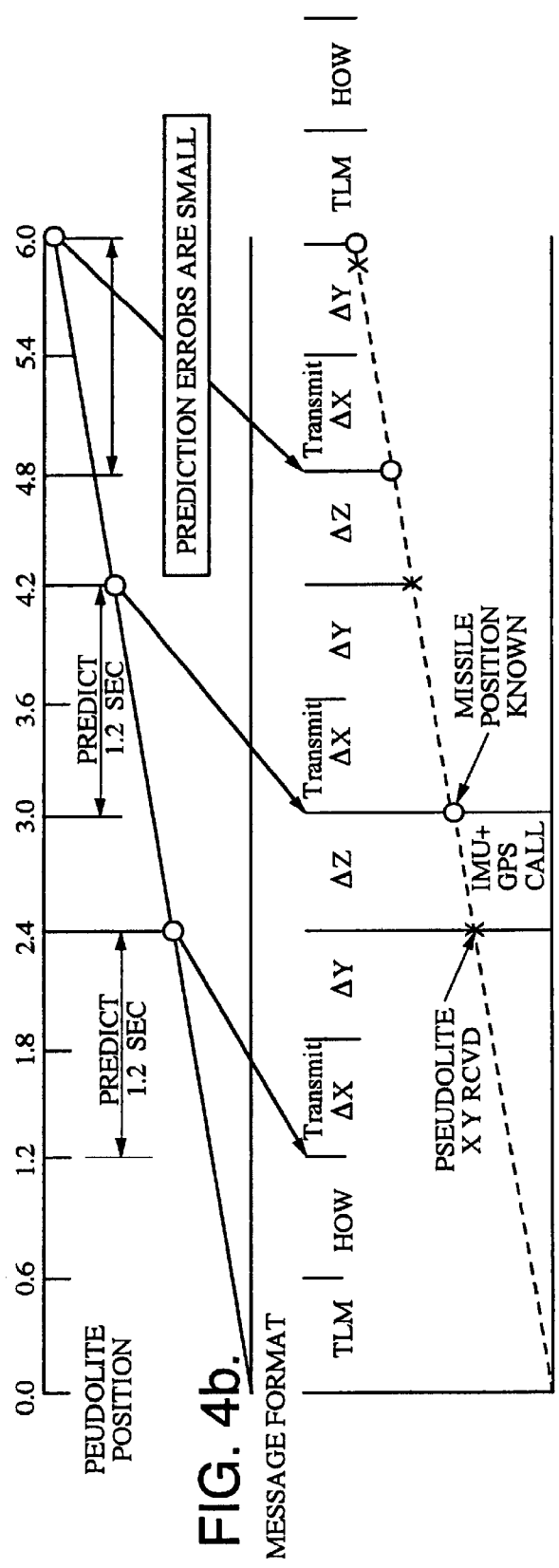
FIG. 4a. PSEUDOLITE POSITION
FIG. 4b. MESSAGE FORMAT
FIG. 4c. MISSILE POSITION
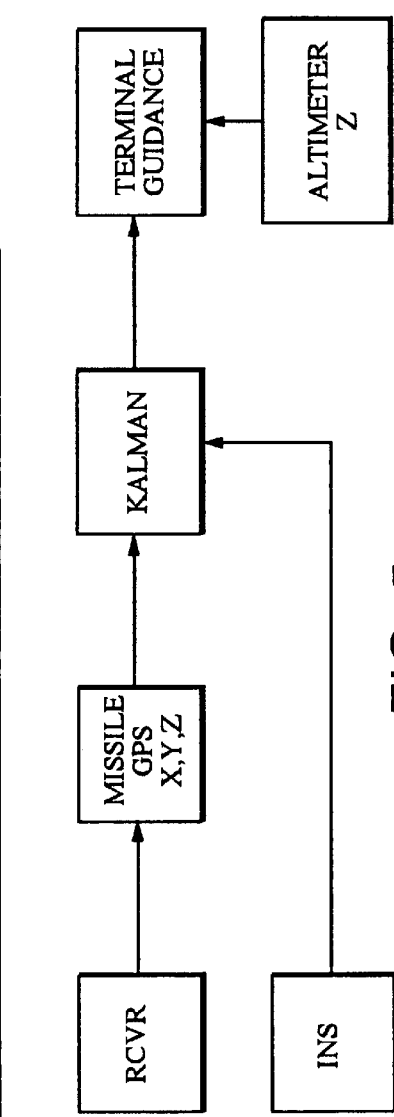
FIG. 5.

AIRBORNE GPS GUIDANCE SYSTEM FOR DEFEATING MULTIPLE JAMMERS

This Application is a Continuation of U.S. patent application Ser. No. 09/061,642, filed Mar. 16, 1998, now abandoned by the present inventors and entitled AIRBORNE GPS GUIDANCE SYSTEM FOR DEFEATING MULTIPLE JAMMERS, now abandoned.

BACKGROUND OF THE INVENTION

1. Field of the Invention

The present invention relates to guidance systems. More specifically, the present invention relates to guidance for weapons systems using the Global Positioning System (GPS).

2. Description of the Related Art

The utility of the Global Positioning System for guidance applications is well recognized. The Global Positioning System is a network of satellites that transmits information in signals, which when received and decoded, allow a receiver to accurately fix its position within a coverage area. For military applications, GPS allows self-guided weapons to find targets with heretofore unknown degrees of accuracy.

Unfortunately, GPS guidance, which uses 10 watt signals from satellites in an 11,000 nautical mile orbit, is notoriously easy to jam with low power, low cost jammers scattered around a target area. As a large number of units would be used to defend high value targets, one by one destruction of the jammers would have a low payoff. If only a few remain operational, they can effectively jam incoming weapon systems.

At least two measures are being considered to provide an anti-jamming countermeasure for GPS guided vehicles. One measure involves the use of a nulling antenna system. In accordance with this approach, the vehicle is equipped with a number of antennas which point a null in the antenna radiation pattern at the source of the jamming signal. Though somewhat effective, this approach can be expensive as the number of jammers that can be nullified is one less than the number of antenna elements. Hence, the effectiveness of this limited approach is questionable if a large number of inexpensive jammers are used.

Thus, there is a need in the art for an effective anti-jamming countermeasure for GPS guided weapon systems.

SUMMARY OF THE INVENTION

The need in the art is addressed by the present invention which provides an improved missile guidance system. The system is designed to operate on GPS signals in an anti-jamming environment. The inventive system includes first, second and third airborne vehicles. A GPS receiver is mounted on each of the three vehicles to receive signals transmitted from spaceborne satellites. Each vehicle acts as a pseudo-satellite or 'pseudolite'. The received GPS signals are processed to provide a first intermediate signal indicating the position of the vehicle. This signal is retransmitted from each vehicle and received by a GPS receiver mounted on a missile. The received intermediate signals from multiple pseudolites are processed in the missile to provide an output signal indicating the position thereof.

In a particular implementation, the position of each pseudolite is predicted and transmitted to the missile to remove the effect of transmission delay. The use of three pseudolites allows for the calculation of x, y position and time (t). A fourth pseudolite could be used to provide for x, y, z, and t determination onboard the missile. However, in the preferred embodiment, the missile is equipped with an altimeter for the purpose of ascertaining the elevation of the missile.

The pseudolites would be airborne in the vicinity of a target area. Because the pseudolites are relatively close to the targets compared to a satellite in an 11,000 nautical mile orbit and because the pseudolites are able to transmit a 100 watts of power or more, the signal strength may be improved by 50 or 60 decibels or more. To succeed as a jammer, a 1 watt jammer, successful against GPS satellites, would need 100,000 watts or 1 megawatt of power to succeed against aircraft carried pseudolites, which would not be feasible economically at the time of filing of the present application.

BRIEF DESCRIPTION OF THE DRAWINGS

FIG. 3($b$) is an illustrative implementation of the format of the pseudo-GPS message signal sent by the pseudolites of the present invention for the first embodiment of the invention in which the pseudolites fly fixed orbits.

FIG. 3($c$) depicts the readout of the data from the receiver as a function of missile position for the first embodiment of the invention in which the pseudolites fly fixed orbits.

FIG. 4($a$) depicts the prediction of the position of the pseudolite as a function of time for an alternative embodiment of the invention in which the pseudolites are not restricted to fly fixed orbits.

FIG. 4($b$) is an illustrative implementation of the format of the pseudo-GPS message signal sent by the pseudolites of the present invention for the alternative embodiment of the invention in which the pseudolites are not restricted to fly fixed orbits.

FIG. 4($c$) depicts the readout of the data from the receiver as a function of missile position for the alternative embodiment of the invention in which the pseudolites are not restricted to fly fixed orbits.

FIG. 5 is a block diagram of the missile electronic circuitry.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
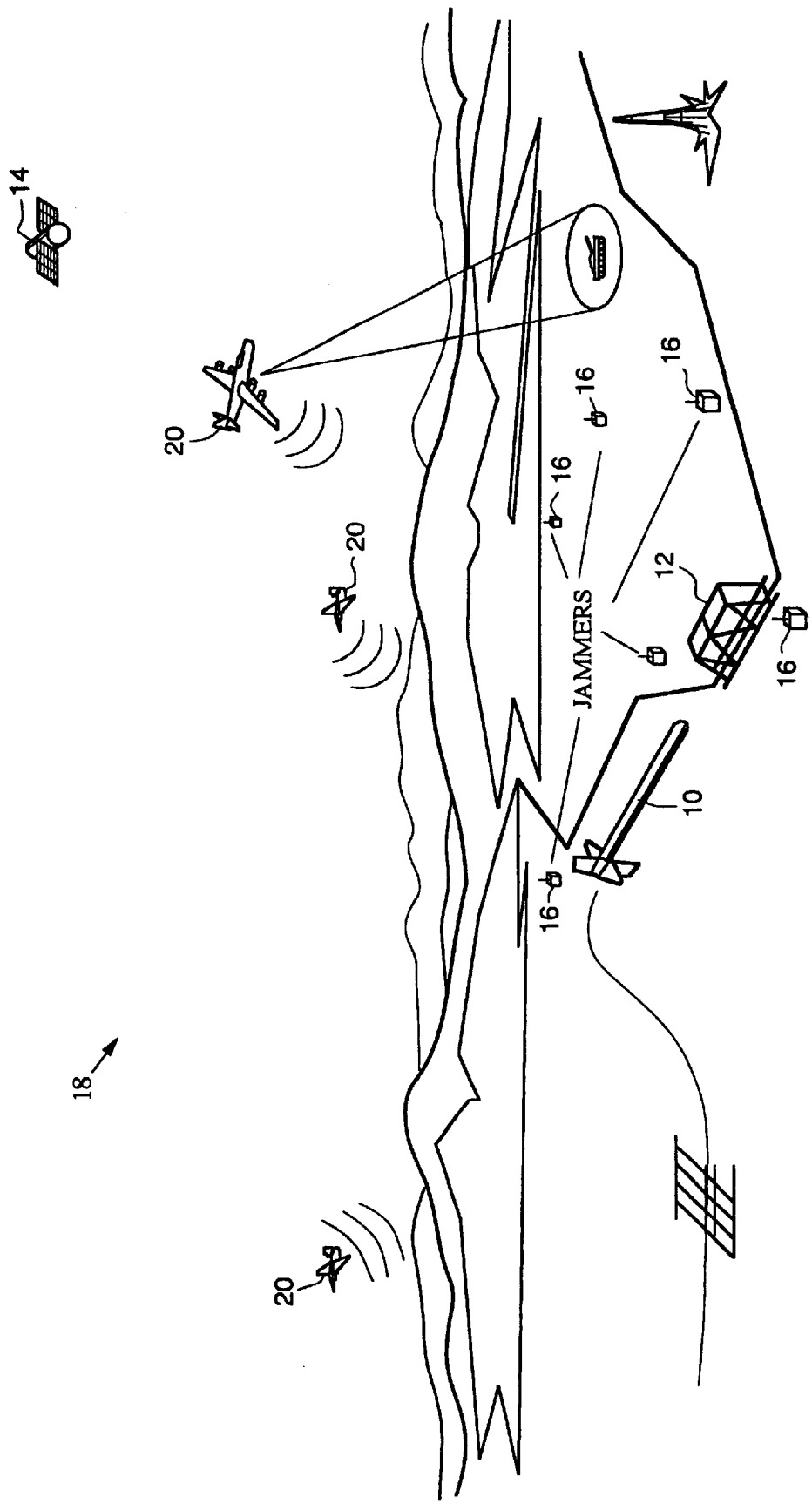
FIG. 1 is a diagram depicting the airborne GPS guidance system of the present invention in an operational environment.

FIG. 1 is a diagram depicting the airborne GPS guidance system of the present invention in an operational environment. Conventionally, a missile 10 is guided to a target 12 using GPS signals from a satellite 14. Unfortunately, as mentioned above, a small number of low power (e.g. 1 watt), low cost jammers 16 may effectively defeat the system. When the GPS link is lost, the missile may drift considerably.

The present invention addresses this problem by providing alternative sources of GPS data. As depicted in FIG. 1, the inventive system 18 includes at least three high power GPS receiver/transmitters which are mounted on airborne platforms 20. Depending on the number and power of the jammers 16, these pseudo-satellites or 'pseudo-lites' 20 may be located 1.4 to 150 miles away from the target area. Yet because the pseudolites 20 are relatively close to the target 12 compared to the satellite 14 in an 11,000 nautical mile orbit and because the pseudolites 20 are able to transmit a kilowatt of power or more, the signal strength may be improved by 50 or 60 decibels or more. To succeed as a jammer, a 1 watt jammer, successful against GPS satellites, would need 100,000 watts or 1 megawatt of power to succeed against aircraft carried pseudolites. This would not be economically feasible in large numbers. In small numbers they could be destroyed by home on jam missiles.

Figure 2:
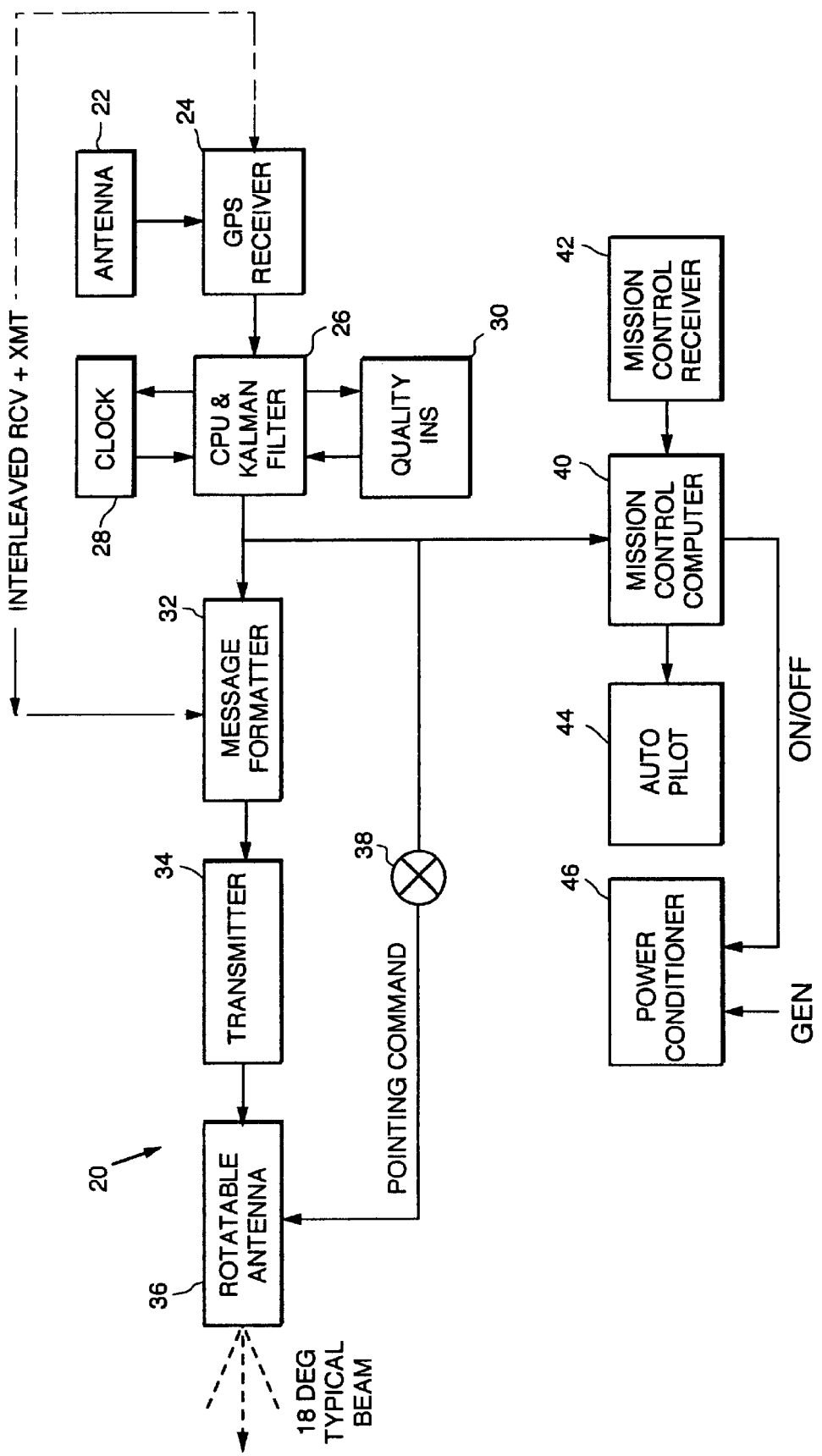
FIG. 2 is a block diagram of a pseudolite designed in accordance with the teachings of the present invention.

FIG. 2 is a block diagram of a pseudolite designed in accordance with the teachings of the present invention. The pseudolite 20 includes a GPS antenna 22 which receives a signal from four or more satellites (14) of FIG. 1. The antenna 22 feeds a GPS receiver 24. The GPS receiver 24 processes the signals and provides x, y, z position data and time (t) related data to a processor 26. The processor 26 performs Kalman filtering to transform the incoming data to acquire an optimum estimate of x, y, z, and t. A local clock 28 is synchronized to the received signal and provides timing signals for the pseudolite 20. The estimate of x, y, z and t is provided to an onboard inertial navigation system (INS) 30. The INS 30 transforms the GPS signal, updated once per second, to a GPS/INS signal which is updated 100 times per second, thus providing more current position data. The output of the INS 30 is fed back to the processor 26. In the preferred embodiment, with the position and orientation information provided by the INS 30, the processor 26 predicts the position of the vehicle to account for the time required to transmit position data to the missile 10. Position is predicted using conventional algorithms and software. Conventionally, this time delay is 0.6–1.2 second.

FIG. 3(a) depicts the prediction of the position of the pseudolite 20 as a function of time.

Returning briefly to FIG. 2, the x, y, z coordinates as a function of time are output to a message formatter 32. The x, y, z coordinates relate to the position of the pseudolite 20 as depicted in FIG. 4.

Figure 4:
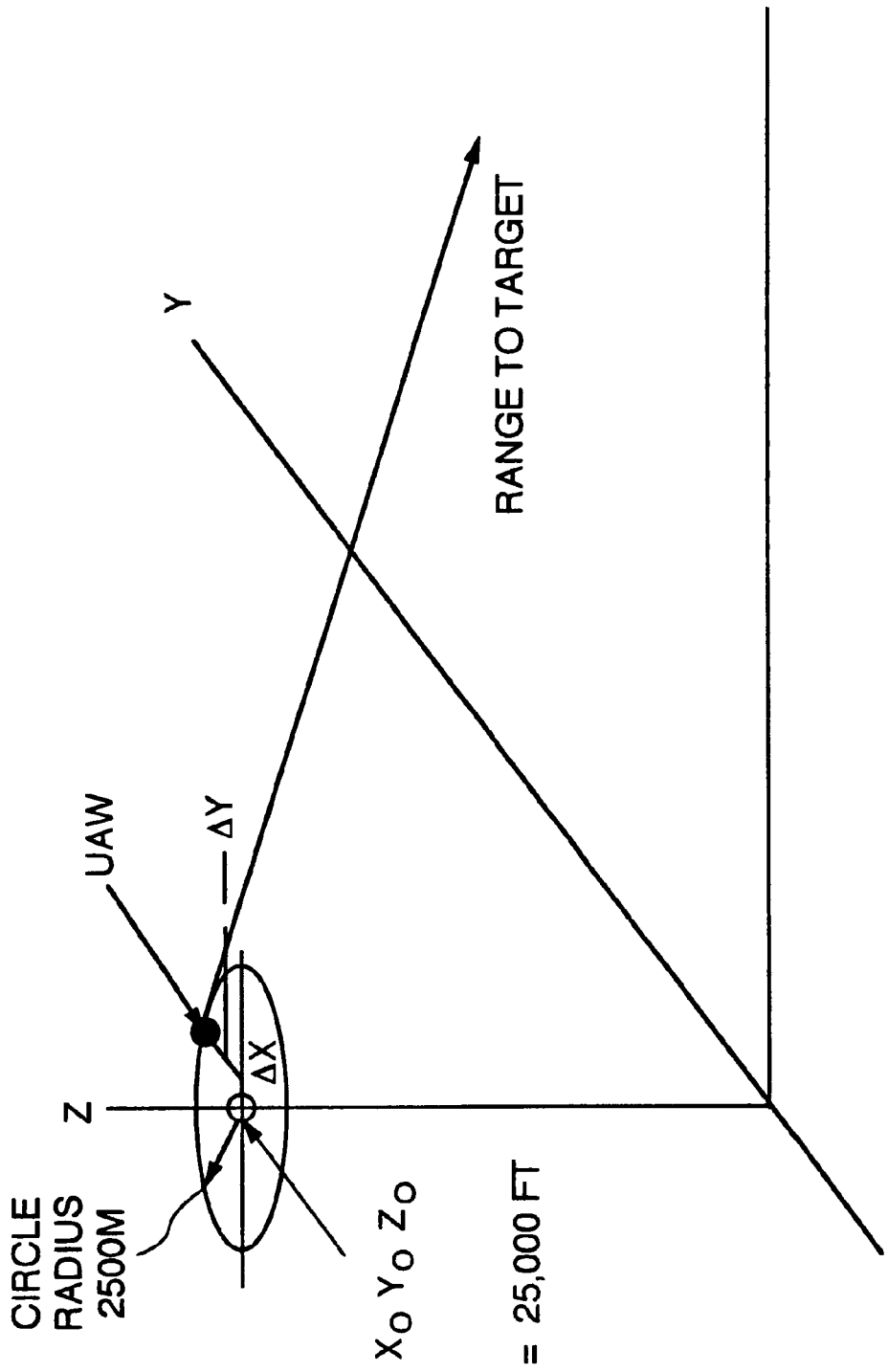
FIG. 4 is a diagram which illustrates the flight path of a pseudolite in accordance with the teachings of the present invention.

FIG. 4 is a diagram which illustrates the flight path of a pseudolite in accordance with the teachings of the present invention. As shown in FIG. 4, the pseudolite 20, which may be a manned or unmanned vehicle, is commanded to fly in a circular pattern with a around a point $x_o$, $y_o$, $z_o$. For example, the vehicle may fly with a 6 degree bank at a radius of 2500 meters and an altitude $z_o$ of 25,000 feet.

Returning to FIG. 2, the processor 26 outputs x, y and t information to a message formatter 32, a differencing device 38 (such as a digital mixer) and a mission control computer 42. The quantities x and y are given by:

$$x = x_o + \Delta x$$

$$y = y_o + \Delta y$$

where $\Delta x$ and $\Delta y$ are provided by the INS unit 30 and $x_o$, and $y_o$ are predetermined as is common in the art.

The format of the message signal is depicted in FIG. 3(b). As shown in FIG. 3(b), the message includes typical GPS headers 'TL4' and 'HOW' along with information required to determine x, y and z. This format was chosen to minimize time latency between the start of position data transmission and its completion, thus reducing errors associated with prediction of UNMANNED AIR VEHICLE position when data transmission is complete. Those skilled in the art will appreciate that other formats may be used without departing from the scope of the present invention. Position in x,y,z requires 24 bits of data for ½ meter resolution which can be transmitted in the standard 30 bit GPS word. Complete x,y,z position requires 3 words occupying 1.8 seconds of transmission time. By selecting a fixed $x_o$, $y_o$, $z_o$ as the center of an orbit described by $\Delta x$, $\Delta y$ from the center, 12 bit words will describe a radius of 2000 meters to an accuracy of ½ meter. Two 12 bit words can be included in a standard 30 bit GPS word, limiting time latency to 0.6 seconds. The z dimension or altitude is held constant and is transmitted once per 6 second subframe.

Figure 3:
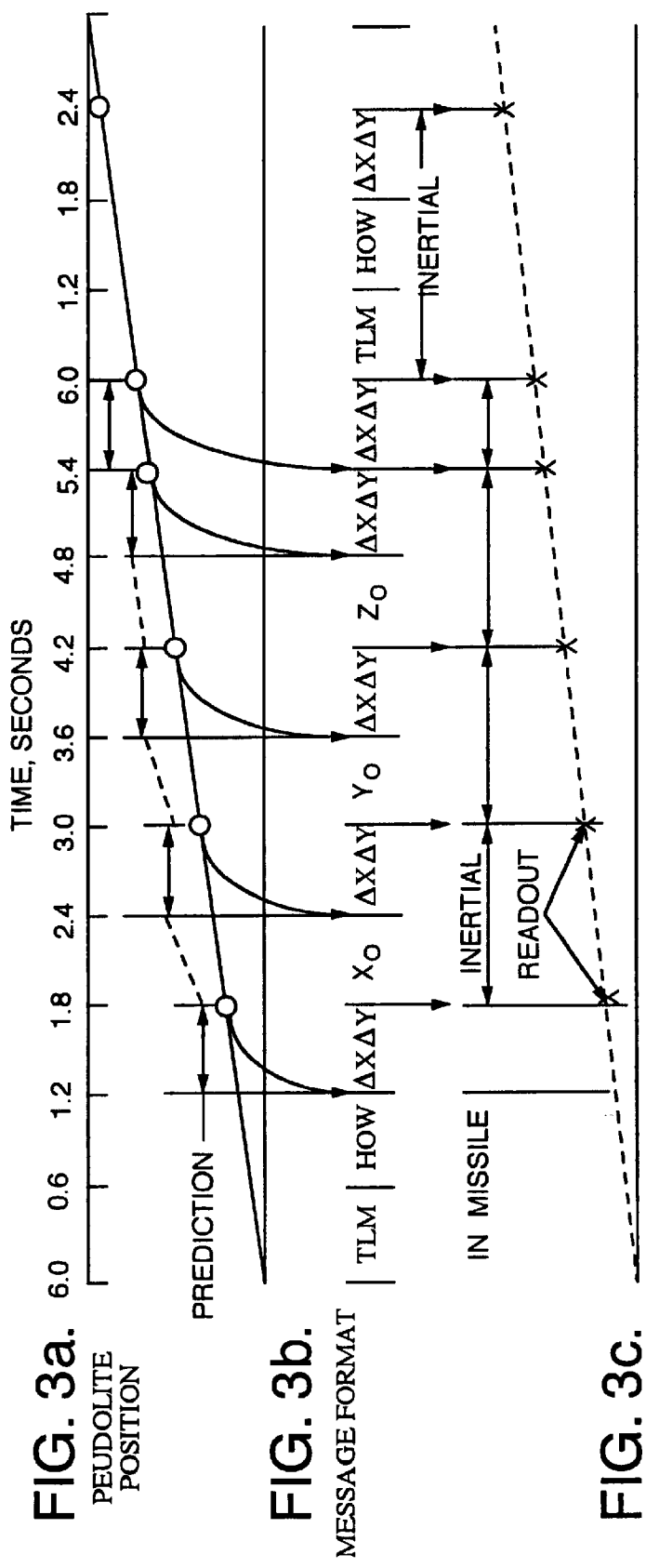
FIG. 3($a$) depicts the prediction of the position of the pseudolite as a function of time for a first embodiment of the invention in which the pseudolites fly fixed orbits.

The format of FIGS. 3(a–c) restricts the pseudolite to fly a fixed trajectory. For obvious reasons, this may be a limitation in a battlefield environment. FIG. 4(a) depicts the prediction of the position of the pseudolite as a function of time for an alternative embodiment of the invention in which the pseudolites are not restricted to fly fixed orbits. FIG. 4(b) is an illustrative implementation of the format of the pseudo-GPS message signal sent by the pseudolites of the present invention for the alternative embodiment of the invention in which the pseudolites are not restricted to fly fixed orbits. A common $x_0$, $y_0$, $z_0$ reference is picked for all four pseudolites and must be supplied as data to all users in the area. FIG. 4(c) depicts the readout of the data from the receiver as a function of missile position for the alternative embodiment of the invention in which the pseudolites are not restricted to fly fixed orbits. When the atmosphere is not exceedingly turbulent, transmission of x,y,z over 1.8 seconds is feasible as shown in FIGS. 4(a–c). For this embodiment, it is necessary that three or four pseudolites be positioned to form a suitable geometry for GPS calculation. That is, the line-of-sight of the pseudolites to the missile must be a pyramid of sufficient proportions as will be understood by one skilled in the art.

Returning to FIG. 2, the output of the formatter 32 is input to a conventional GPS transmitter 34. In the preferred embodiment, the transmitter 34 has 1 kilowatt of power for 100 to 200 miles from the target. The transmitter 34 feeds a rotatable antenna 36 which is pointed at the target area under control of a signal from the difference device 38 which subtracts the vehicle position from the processor 26 from the known target area position. Position data from the processor 26 is also provided to a mission control computer 40. The computer 40 receives mission control instructions via a receiver 42 and controls an autopilot 44 to control the flight path in the event that the vehicle is unmanned. The computer 40 also controls a power conditioner 46.

A simplified arrangement mounts a fixed transmit antenna on the side of the platform which is constrained to fly a circular path around the target area. Both left and right antennas can be available.

Returning to FIG. 1 the missile 10 receives pseudo-GPS (PGSP) signals from the three pseudolites 20 and uses them to home in on the target 12.

FIG. 5 is a block diagram of the missile electronic circuitry. The circuit includes a GPS receiver 52 which is set up to receive signals from the pseudolites 20. FIG. 3(c) depicts the readout of the data from the receiver as a function of missile position. It is important to note that the pseudolites 20 should be programmed to use the identification numbers of the antipodal GPS satellites, those that are on the other side of the earth from the target area. The missile 10 should be programmed to use the same numbers. This allows the missiles to track the PGPS signals instead of the satellites.

Returning to FIG. 5, the missile receiver 52 provides raw GPS signals to an onboard missile processor 54 which processes the received GPS signals to extract missile x, y and t position data. The accuracy of this data is enhanced by a Kalman filter 56 with input from an onboard inertial navigation system 58. The Kalman filter 56 outputs missile x and y data to a terminal guidance unit 60. The terminal guidance unit receives altitude (z) data from an altimeter 62 and directs the missile to the target 12 using stored data as to its location.

In the preferred embodiment, to avoid self-jamming, the transmitter and receiver operate interleaved at a 50% duty cycle each and a rate compatible with data transmission.

Figure 6:
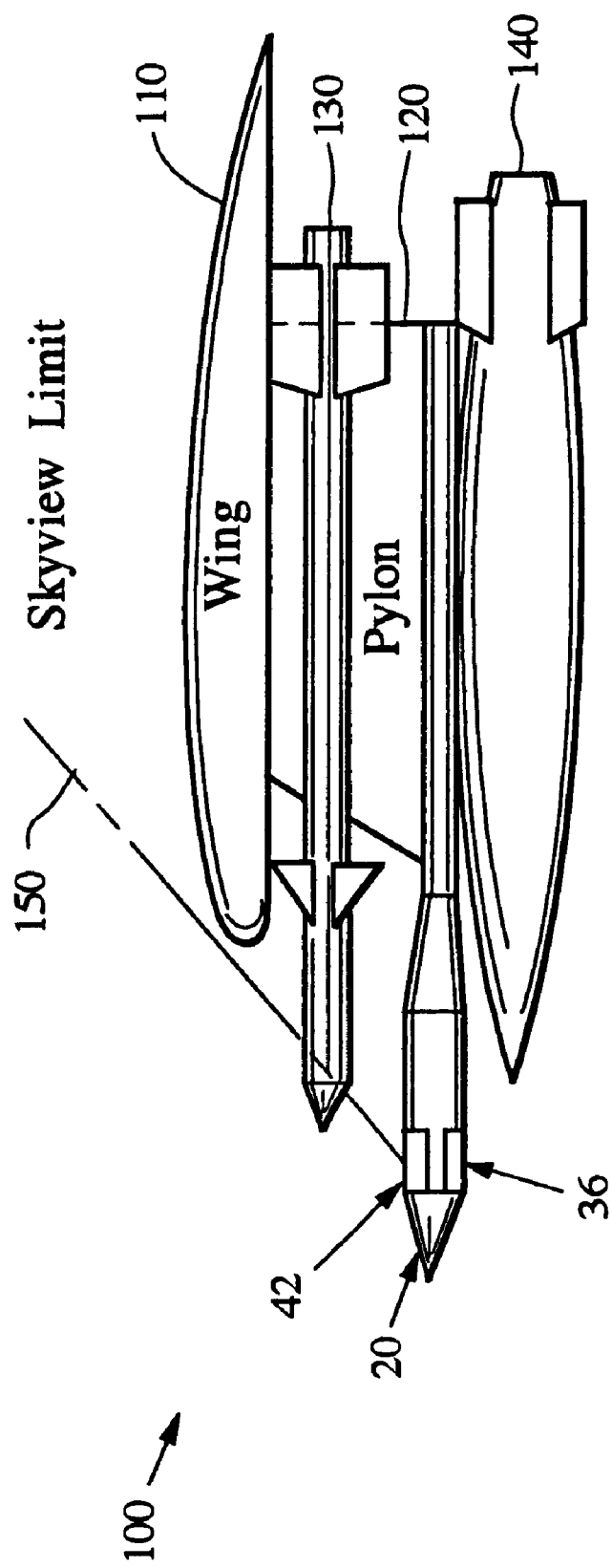
FIG. 6 is a diagram of an illustrative mounting arrangement of a pseudolite on an aircraft weapons pylon.

An alternative implementation is to equip 3 or 4 attacking aircraft delivering GPS/INS guided munitions with pseudolite equipment as shown in FIG. 6. FIG. 6 is a diagram of an illustrative mounting arrangement of a pseudolite on an aircraft weapons pylon. The arrangement 100 shows a pseudolite 20 mounted underneath a wing 110 of an aircraft on a pylon 120 thereof between a missile 130 and a Joint Direct Attack Munition (JDAM) 140. Note that the pseudolite 20 extends beyond the skyview limit 150 of wing 110. The pseudolite receivers need to see only one satellite to calculate accurate time since x, y, z data is available from the aircraft GPS via a MIL STD 1553 bus. This design allows for a mount of a pseudolite on an aircraft weapons platform without displacing the weapon, hence, no aircraft alterations are required and less auxiliary equipment is required.

Aircraft equipped as shown in FIG. 6 fly over the target area at altitudes (typically 25,000 to 40,000 feet) in a pattern that enables GPS calculation and also effect delivery of the weapons. The weapons are then delivered accurately by power GPS in the presence of jammers. At four to six miles of altitudes, a typical 10 watt jammer will not affect pseudolite GPS receivers capable of 80 dB of jam resistance.

The invention described has a capability to jam the C/A GPS receivers used by the enemy. The three or four pseudolites are synchronized to the 50% transmit/receive cycle or each one is offset from the others to deliver energy into the target area 100% of the time.

Self-jamming is avoided by keeping the pseudolites separated in space. The transmit antenna is pointed at the target area so the neighboring pseudolite is in a minus 10 dB sidelobe and the receive antennas look upward so that pseudolites at the same altitude are down 10 dB. With 100 watt pseudolites at 15 NM radius and separated by 15 NM, the J/S (jammer to signal) ratio is 40 dB. A quality receiver can handle J/S of 60–80 dB and thus is not jammed.

Thus, the present invention has been described herein with reference to two particular embodiments for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A guidance system comprising:
   first means mounted on a mobile airborne vehicle for receiving a plurality of signals from spaceborne satellites indicating the positions thereof;
   second means for processing the received signals to provide a first intermediate signal indicating the position of the vehicle;
   third means for transmitting the first intermediate signal;
   fourth means mounted on a missile for receiving the first intermediate signal; and
   fifth means for processing the received first intermediate signal to provide an output signal indicating the position of the missile.

2. The invention of claim 1 wherein the first means is a GPS receiver.

3. The invention of claim 1 wherein the second means includes means for predicting the position of the airborne vehicle and incorporating the prediction into the first intermediate signal.

4. The invention of claim 1 wherein the second means includes means for formatting the first intermediate signal.

5. The invention of claim 1 wherein the third means includes a directional antenna.

6. The invention of claim 1 wherein the fourth means includes a GPS receiver.

7. The invention of claim 1 wherein the fifth means includes an altimeter.

8. A guidance system comprising:
   first, second and third mobile airborne vehicles;
   first means mounted on each airborne vehicle for receiving GPS signals;
   second means mounted on each vehicle for processing the received signals to provide a first intermediate signal indicating the position of the vehicle;
   third means mounted on each vehicle for transmitting the first intermediate signal;
   fourth means mounted on a missile for receiving the first intermediate signal from each vehicle; and
   fifth means for processing the received first intermediate signal to provide an output signal indicating the position of the missile.

9. The invention of claim 8 wherein the second means includes means for predicting the position of the airborne vehicle and incorporating the prediction into the first intermediate signal.

10. The invention of claim 8 wherein the second means includes means for formatting the first intermediate signal.

11. The invention of claim 8 wherein the third means includes a directional antenna.

12. The invention of claim 8 wherein the fourth means includes a GPS receiver.

13. The invention of claim 8 wherein the fifth means includes an altimeter.

14. A guidance technique including the steps of:
   receiving on a mobile airborne vehicle a plurality of signals from spaceborne satellites indicating the positions thereof;
   processing the received signals to provide a first intermediate signal indicating the position of the vehicle;
   transmitting the first intermediate signal;
   receiving on a missile the first intermediate signal; and
   processing the received first intermediate signal to provide an output signal indicating the position of the missile.

* * * * *